United States Patent [19]

Manzoni

[11] 4,171,648
[45] Oct. 23, 1979

[54] DEVICE FOR ADJUSTING A REAR-VIEW MIRROR

[76] Inventor: Stephane Manzoni, 1, rue Pasteur, 39200 Saint-Claude, France

[21] Appl. No.: 869,622

[22] Filed: Jan. 16, 1978

[30] Foreign Application Priority Data

Jan. 27, 1977 [FR] France .................. 77 02313
Feb. 11, 1977 [FR] France .................. 77 03979

[51] Int. Cl.² ............................................. F16H 23/00
[52] U.S. Cl. ...................................... 74/60; 74/501 M; 74/503; 350/28 B
[58] Field of Search ............... 74/54, 501 M, 503, 60; 350/22, 285, 269, 307, 273, 288

[56] References Cited

U.S. PATENT DOCUMENTS

| 3,010,339 | 11/1961 | Brock | 74/60 |
| 3,253,509 | 5/1966 | Peters | 350/281 |
| 3,359,810 | 12/1967 | Hansen | 74/60 |
| 3,550,456 | 12/1970 | Pringle | 350/279 X |
| 3,655,273 | 4/1972 | Pringle | 350/281 |

Primary Examiner—C. J. Husar
Assistant Examiner—Conrad Berman
Attorney, Agent, or Firm—James E. Nilles

[57] ABSTRACT

A device for adjusting a rear-view vehicle mirror in which a tubular support extending through the vehicle bodywork carries a pair of manually rotatable knobs at its inner end and a mounting for the mirror at its outer end. When one knob is rotated, it drives a shaft extending within the support. This shaft either directly rotates the mounting and mirror about a horizontal axis or drives gearing causing such rotation. The mounting has a pin with an axis transverse to the horizontal axis. The mirror is rotatable in either direction about this transverse axis by pushing motion transmitted thereto by linear movement of one or other of two rods extending in the support parallel with the shaft axis. These rods are moved simultaneously in mutually opposite directions by an arrangement converting rotary motion of the other knob into the linear motion.

12 Claims, 9 Drawing Figures

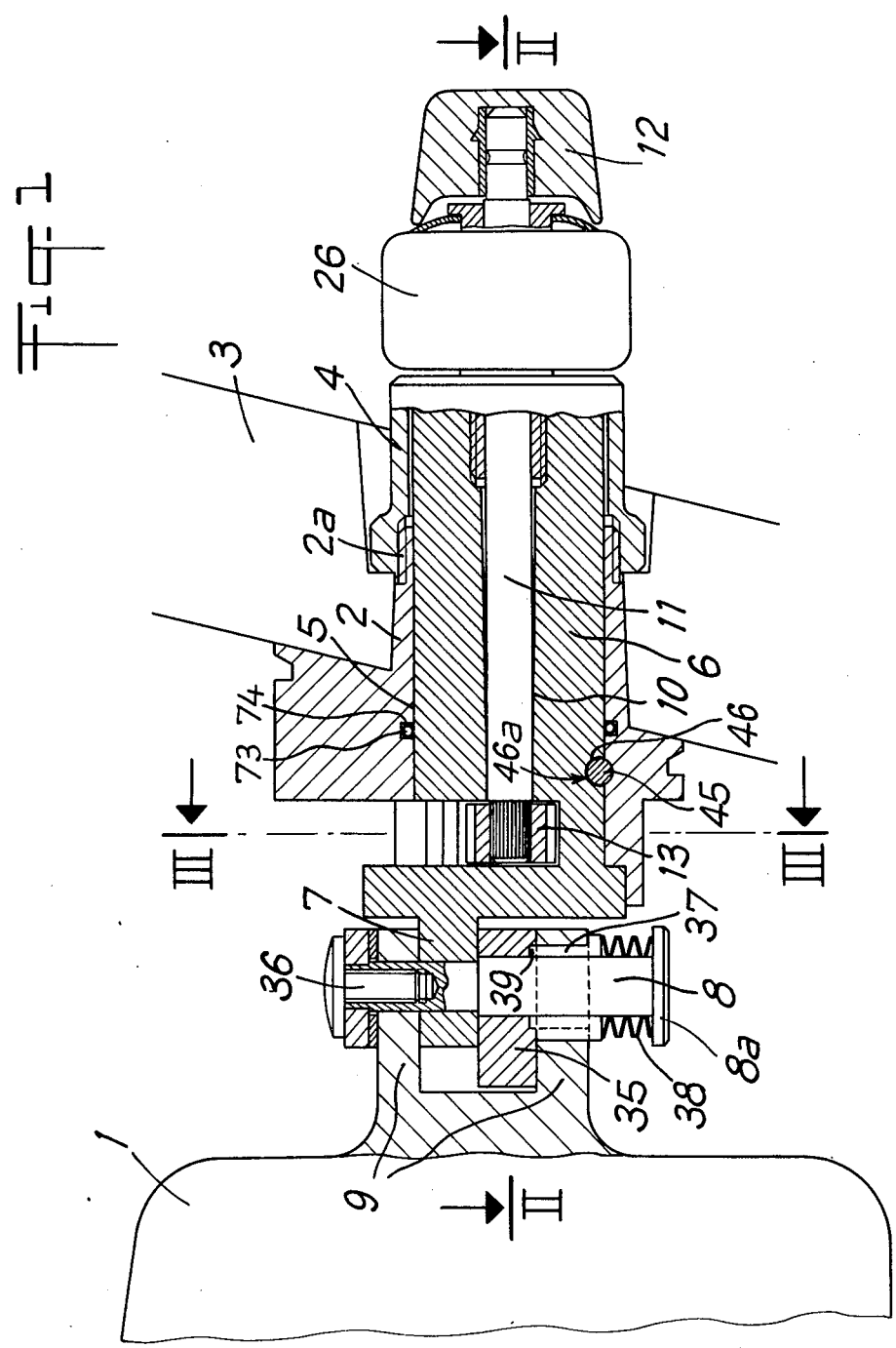

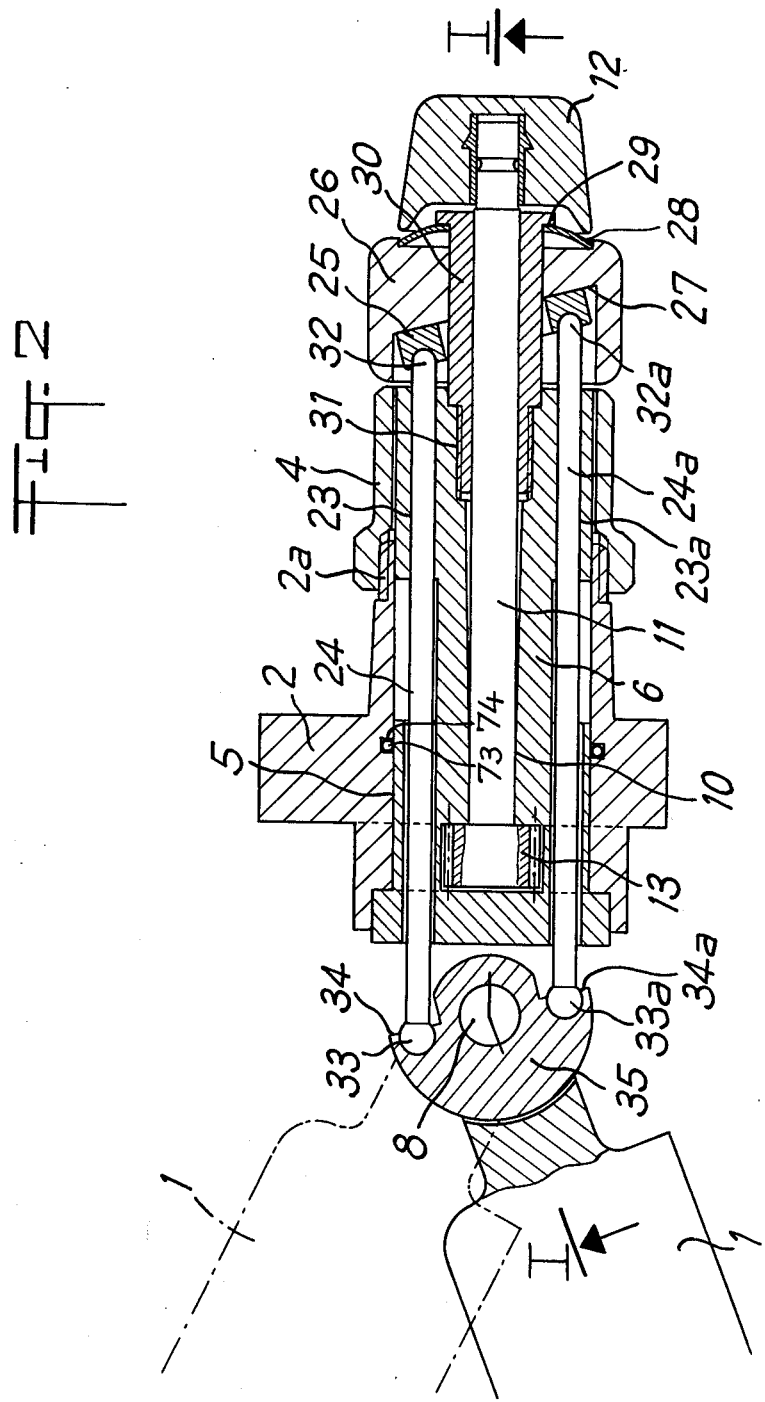

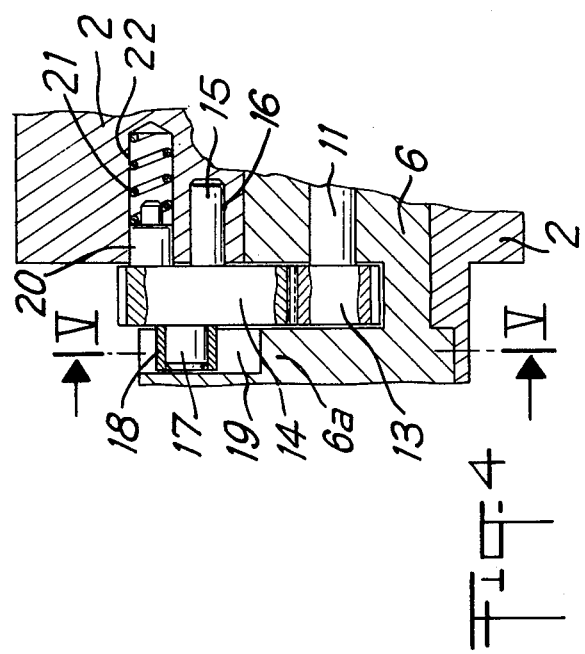
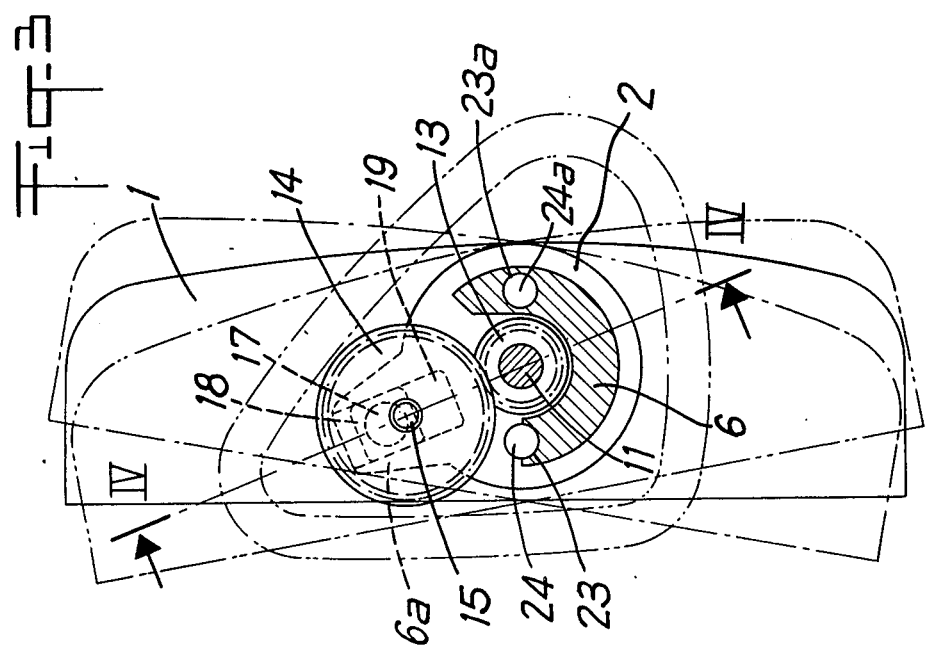

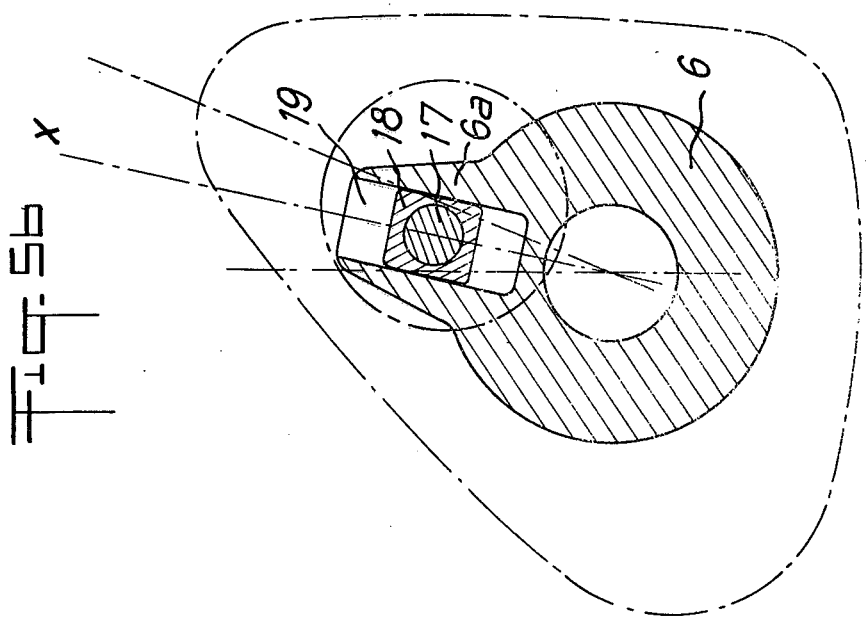
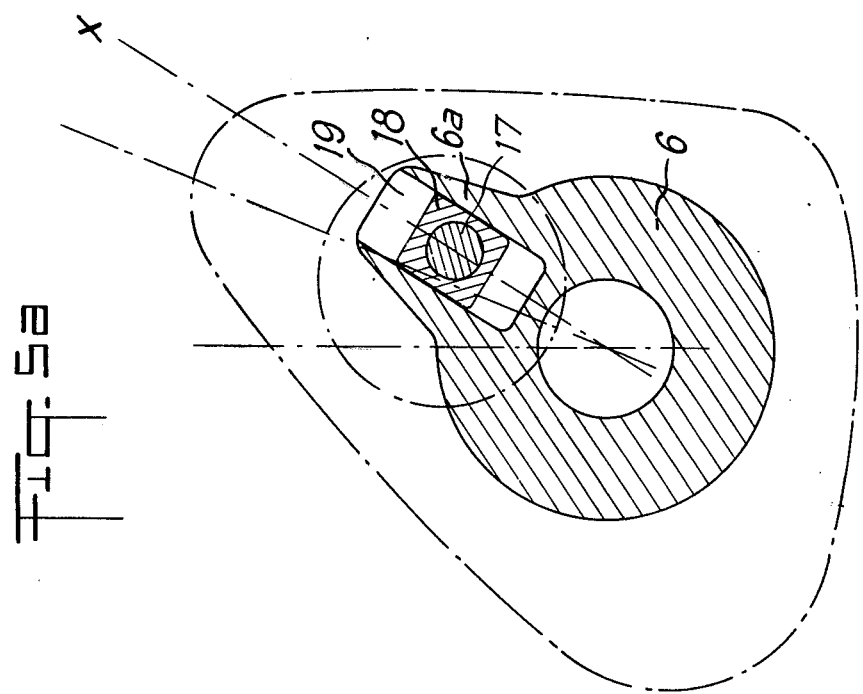

DEVICE FOR ADJUSTING A REAR-VIEW MIRROR

The present invention relates to a device for adjusting a rear-view mirror, in particular, for a vehicle.

It is known to use devices for adjusting a rear-view mirror comprising a support member fixed to the body work of the vehicle, in particular a door, and passing through the latter in order to facilitate the passage of control members inside the vehicle in order to adjust the orientation of the mirror about a vertical axis and a horizontal axis.

However, these so-called "panel mounted" adjusting devices have either the drawback of being too direct in their control and of not facilitating sufficiently accurate adjustment of the mirror, or the drawback of being too complicated, which incurs high costs and are more difficult to operate.

According to the present invention, the device comrises a support member fixed to the panel of a vehicle door and passing through the latter in order to facilitate the passage of the control members inside the vehicle for adjusting the orientation of a casing and a rear-view mirror about a vertical axis and a horizontal axis, said support member being provided internally with a cylindrical body mounted to pivot about a horizontal axis and connected at one of its ends to a vertical shaft on which the rear view mirror is mounted, characterised in that the cylindrical body is connected to a first actuating member and to means for rotating said body along a horizontal axis, said body comprising two parallel push-rods connected at one of their ends to a second actuating member and bearing at their other end against the sides of a control member connected to the casing along a vertical axis.

This arrangement of the regulating means according to the invention is very simple and allows a very accurate adjustment of the mirror both along the vertical axis and the horizontal axis.

Furthermore, the very low number of parts constituting the device facilitates an inexpensive construction.

According to another advantage of the invention, the control is effected by means facilitating an adjustment by a continuous rotation of the same direction of the actuating members, i.e. it eliminates rotation of the actuating members in one direction or the other in order to bring the mirror into a predetermined position.

Further features and advantages of the invention will be better understood on reading the following description of several embodiments and with reference to the accompanying drawings in which:

FIG. 1 is a longitudinal sectional view on line I—I of FIG. 2 of one embodiment of the device for adjusting a rear-view mirror according to the invention;

FIG. 2 is a sectional view on line II—II of FIG. 1;

FIG. 3 is a sectional view on line III—III of FIG. 1;

FIG. 4 is a sectional view on line IV—IV of FIG. 3;

FIGS. 5a and 5b are sectional views on line V—V of FIG. 4, in two different positions;

FIGS. 1, 2 and 3 show one embodiment of a device for adjusting a rear-view mirror 1 along a vertical axis and a horizontal axis.

Figure 6:
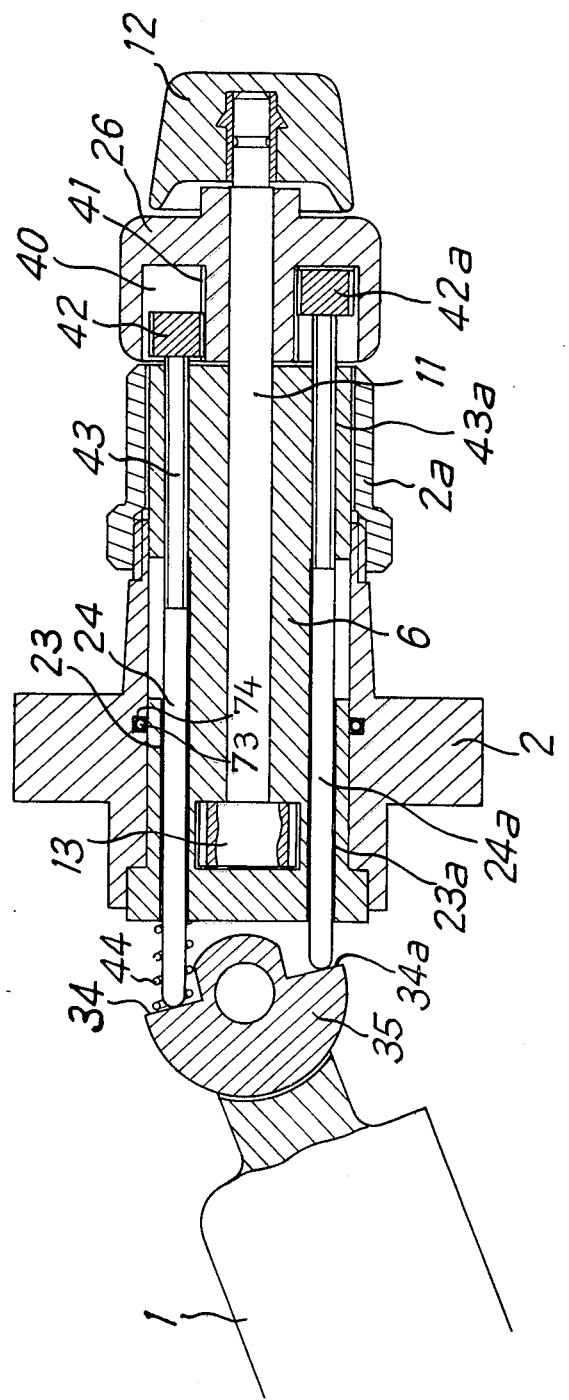
FIG. 6 is a longitudinal sectional view of another embodiment of the device for adjusting a rear-view mirror according to the invention.

This adjusting device comprises a tubular support member 2 passing through a panel 3 of a vehicle door on which said support member 2 is retained by a nut 4 screwed onto a screw-threaded part 2a of said member.

The pin 45 housed in the support member 2 bears on the side 46 of a partial circular groove 46a in the rotary cylindrical body 6 and prevents its axial movement.

The support member 2 comprises a bore 5 in which a cylindrical body 6 is pivotally mounted, which body comprises at one of its ends a lug 7 on which is mounted by means of a vertical shaft 8, a clevis 9 integral with the casing of the rear-view mirror 1 and other members which will be described in detail hereafter.

The body 6 comprises a central bore 10 in which a shaft 11 is mounted to rotate, fixed on which shaft a one of its ends is a first actuating member 12 and at its other end a toothed pinion 13 (FIGS. 3 and 4) which meshes with a toothed wheel 14 whose shaft 15 is mounted to rotate in a bore 16 in the support member 2. On its side opposite its rotary shaft, the toothed wheel 14 comprises an eccentric crank pin 17 on which a slide 18 of parallelepipedal shape is mounted, moving in a groove 19 provided in an extension 6a of the body 6.

On the side opposite the eccentric crank pin 17, the toothed wheel 14 is subjected by means of a lug 20 to the action of a helical spring 21 located in a housing 22 provided in the support member 2 for the purpose of retarding the rotation of the wheel 14. It is also possible to achieve braking of the rotary arrangement by resilient means, constituted in particular by a complete or partial resilient annular gasket 73, housed in a groove 74 in the tubular support member (FIGS. 1, 2 and 6).

The body 6 comprises two lateral bores 23, 23a in which two parallel rods 24, 24a are slidably mounted, which rods bear at one of their semi-spherical ends 32, 32a against a ring 25 located in a housing of a second rotary actuating member 26 whose base 27 is inclined in order to impart a reciprocating movement to the rods 24, 24a.

The connection between the rods 24, 24a, the ring 25 and the actuating member 26 is obtained by means of a resilient washer 28 which bears on one side against said actuating member and on the other side against a shoulder 29 of a sleeve 30 whereof a screwthreaded part 31 is engaged in a corresponding tapped part of the body 6.

At their other semi-spherical end 33, 33a, the sliding rods 24, 24a bear against the sides 34, 34a of a control member or swing-bar 35 mounted to pivot on the shaft 8 such that by moving the rods 24, 24a a rotary movement is imparted to the swing-bar 35.

The shaft 8 is engaged in holes provided in the sides of the clevis 9 and it is fixed by means of a screw 36 to one of the sides of said clevis, whereas the lug 7 and the swing-bar 35 are engaged between the sides of said clevis.

Mounted on the shaft 8, on the opposite side to the screw 36 is a sleeve 37 connected and sliding axially in the clevis 9 and which comprises finger members 39 engaged in known manner in corresponding housings in the swing-bar 35 under the action of a pile of resilient washers 38 bearing against the head 8a of the shaft 8.

The adjusting device operates in the following manner.

If one acts on the first actuating member 12, the central shaft 11 and by means of the pinion 13, the toothed wheel 14 are set in rotation (FIGS. 3, 4), as it rotaes, said toothed wheel causes the movement of the eccentric crank pin 17 and of the slide 18 which is retained in the groove 19 provided in the extension 6a of the cylindrical body 6.

As can be seen in FIGS. 5a and 5b, the movement of the slide 18 in the groove 19 causes the angular pivoting of the axis X of the cylindrical body 6 about the horizontal axis and consequently, of the rear-view mirror 1 as shown in FIG. 3.

In order to obtain the rotation of the rear-view mirror about the vertical axis, a rotation is imparted to the actuating member 26 and due to a cam movement coming from the inclined position of the ring 25, this results in a reciprocating movement of the sliding rods 24, 24a which cause pivoting of the swing-bar 35 about the shaft 8.

Since the swing-bar 35 is connected by the sleeve 37 to the clevis 9 of the casing of the rear-view mirror, the latter is rotated about the vertical axis as shown in FIG. 2.

FIG. 6 shows a variation of the device for adjusting a rear-view mirror according to the invention, in which only the control of the parallel sliding rods 24, 24a has been modified.

In fact, an annular housing 40 is provided in the second actuating member 26, which housing comprises a part constituting a toothed pinion 41 having inner or outer toothing which meshes with two toothed pinions 42, 42a fixed to one of the ends of the rods 24, 24a in order to rotate the latter.

One part of their length, the rods 24, 24a have a screw-thread 43, 43a by which they are engaged in corresponding tapped holes provided in the cylindrical body 6.

At their other end, the rods 24, 24a bear in the same manner as previously against the sides 34, 34a of the swing-bar 35 and a helical spring 44 is located on one of the rods 24, which spring bears on one side against the side 34 of the swing-bar 35 and on the other side against the body 5.

When one acts on the actuating member 26, one sets in rotation the pinions 41, 42 and 42a as well as the rods 24, 24a which are connected to rotate with the pinions 42, 42a.

Owing to the fact that the rods 24, 24a have a screw-threaded part 43, 43a of opposed pitch, engaged in a tapped hole, this results in a helical movement of the rods 24, 24a which act by an inverted axial movement on the sides 34, 34a of the swing-bar 35, the latter rotating the casing of the rear-view mirror 1 along a vertical axis, as described previously.

Figure 7:
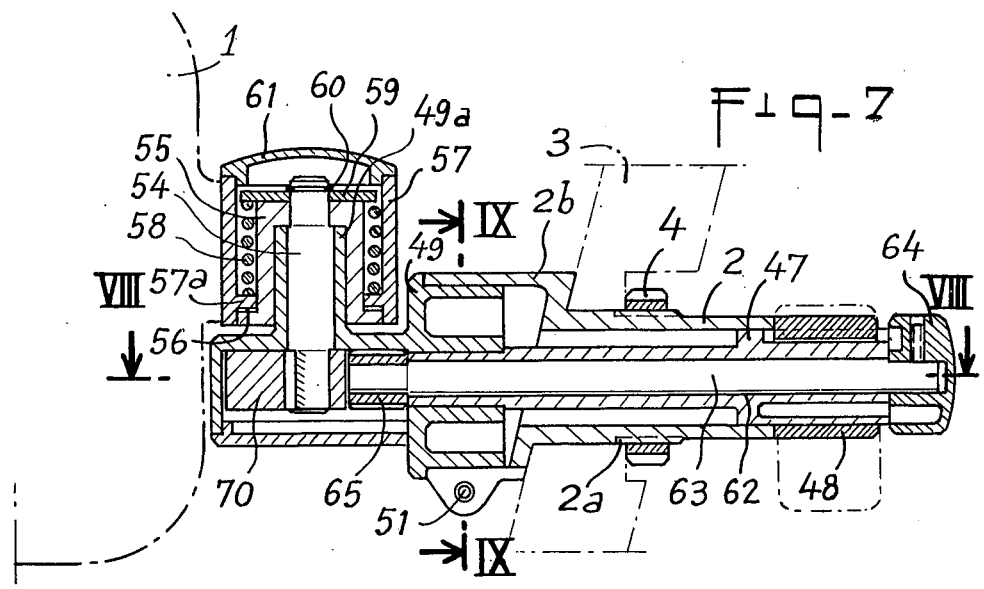
FIG. 7 is a longitudinal sectional view of another embodiment of the device for adjusting a rear-view mirror according to the invention.
Figure 8:
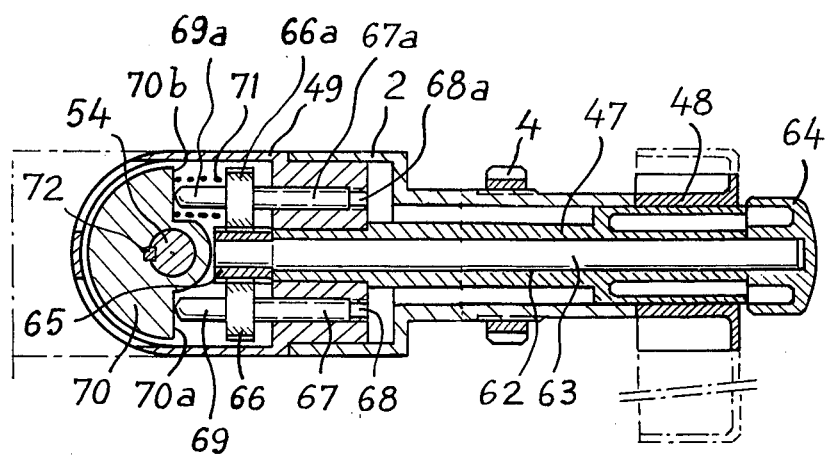
FIG. 8 is a sectional view on line VIII—VIII of FIG. 7.
Figure 9:
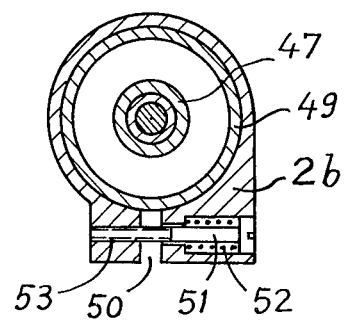
FIG. 9 is a sectional view on line IX—IX of FIG. 7.

FIGS. 7, 8 and 9 show one embodiment of a device for adjusting a rear view mirror 1 along a vertical axis and a horizontal axis.

This adjusting device comprises a tubular support member 2 passing through the panel 3 of a vehicle door on which said support member 2 is held by a nut 4 screwed onto a screw-threaded part 2a of said member.

Mounted to pivot inside the support member 2 is a cylindrical body 47 supporting at one of its ends a first actuating member or handle 48 and provided at its other end with an end-piece 49 fixed to body 47 and pivoting with the latter in the support member 2 which comprises a collar 2b comprising a slot 50 and provided with a screw 51 subject to the action of a helical spring 52 and engaged in a tapped hole 53 in the collar. This arrangement makes it possible to regulate the braking of the end-piece 49 as it rotates.

The end-piece 49 is extended by a bearing 49a in which a vertical shaft 54 is mounted to rotate and to which is fixed a sleeve 55 comprising in its lower part housings in which are engaged in known manner corresponding pins 56 integral with a ring 57 forming part of the casing of the rear-view mirror 1. Said ring 57 comprising a shoulder 57a against which a helical spring 58 bears on one side and a washer 59 on the other side, retained by a resilient washer or clip 60, engaged in a groove in the vertical shaft 54. The ring 57 is closed at its upper part by a stopper 61.

The cylindrical body 47 comprises a bore 62 in which a rod 63 is mounted to rotate, which rod is connected at one of its ends to an actuating member or knob 64 and which is connected at its other end to a main pinion 65 meshing with two secondary pinions 66, 66a arranged symmetrically with respect to the axis of the rod 63 and comprising at one of their ends, screw-threaded rods 67, 67a of opposed pitch, which are engaged in respective tapped holes 68, 68a in the end-piece 49 integral with the body 47, said pinions 66, 66a comprising at their other end, two push-rods 69, 69a which are in contact with two opposed sides 70a, 70b of a control member or swing-bar 70.

A spring 71 is interposed between the side 70b of the swing-bar and the pinion 66a for the purpose of taking up the operating clerance.

The swing-bar 70 is keyed at 72 on the vertical shaft 54 and it is subject to the action of the helical spring 71.

The device for adjusting the rear-view mirror 1 operates in the following manner.

In order to proceed with adjusting the rear-view mirror 1 along the horizontal axis, one acts on the first actuating member or lever 48 in order to rotate the body 47 in the support member 2. Since this body 47 is integral with the end-piece 49 which supports the rear-view mirror 1 by means of the shaft 54, rotation of the first actuating member 48 causes rotation of the rear-view mirror along the horizontal axis.

If one acts on the second actuating member 64, one causes rotation of the rod 63 and of the pinion 65 which rotates the secondary pinions 66, 66a integral with the screw-threaded rods 67, 67a which move longitudinally owing to the fact that they are engaged in tapped holes 68, 68a. Since the main pinion 65 driving the secondary pinions and the screw-threaded rods are of opposed pitch, this results in the reverse movement of the push-rods 69, 69a acting on the swing-bar 70 which causes the rotation of the vertical shaft 54 keyed on the swing-bar. Owing to the fact that the casing the rear-view mirror is connected to the shaft 54 by the sleeve 55 and the ring 57, pivoting of the rear-view mirror about the vertical axis takes place.

Naturally, various modifications can be applied by a man skilled in the art to the devices or methods which have been described, solely as non-limiting examples, without diverging from the framework of the invention.

I claim:

1. A device for adjusting a rear-view mirror in particular for a vehicle, comprising a support member fixed to the panel of a vehicle door and passing through the latter in order to facilitate the passage of the control members inside the vehicle for adjusting the orientation of a casing carrying a rear-view mirror about a vertical axis and a horizontal axis, said support member being provided internally with a cylindrical body mounted to rotate about a horizontal axis and connected at one of its ends, to a vertical shaft of which the rear view mirror is mounted, the cylindrical body being connected to a first actuating member and to means for rotating said body about a horizontal axis, and said body comprising two parallel push-rods connected at one of their ends to a second actuating member and bearing at their other end against the sides of a control member connected to the casing along a vertical axis.

2. A device according to claim 1, in which the body comprises a central bore in which a shaft is mounted, provided at one of its ends with a first actuating member and at its other end with a pinion which meshes with a toothed wheel mounted to rotate on the support member and comprising an eccentric crank pin on which a slide is mounted, which moves in a groove provided in an extension of the cylindrical body.

3. A device according to claim 2, in which on one of the sides opposite the slide, the toothed wheel is subject to the action of a resilient member bearing against the support member.

4. A device according to claim 1, in which the second actuating member comprises internally or externally, a toothed part, meshing with which are two pinions fixed to one of the ends of two parallel sliding rods which comprise screw-threaded parts of opposed pitch engaged in tapped parts of the bores intended to receive said rods.

5. A device according to claim 1, in which the second actuating member comprises internally a cam, bearing against which by one of their ends are the two parallel sliding rods whose other end bears against the sides of a swing-bar connected to the casing along a vertical axis.

6. A device according to claim 5, in which a ring is located inside the second actuating member and bears against the base of an inclined housing provided in said actuating member, said ring being in contact with one of the ends of two parallel sliding rods under the action of a resilient member bearing on one side against the shoulder of a sleeve connected to the cylindrical body and on the other side against the actuating member.

7. A device according to claim 6, in which a resilient member is provided around one of the sliding rods and bears on one side against the cylindrical body and on the other side against one of the sides of the swing-bar.

8. A device according to claim 7, in which the casing comprises a clevis connected to a sleeve, the clevis is mounted by means of a shaft on a lug of the cylindrical body and on the swing-bar which comprises housings for engagement by finger members of the sleeve under the action of a spring member bearing against a shoulder of the shaft.

9. A device for adjusting a rear-view mirror according to claim 1, in which spring means is located between the body and the tubular support for braking and taking up the play of the rotatable arrangement located between the body and the tubular support, said spring means being in particular a complete or partial resilient annular gasket.

10. A device for adjusting a rear-view mirror according to claim 1, in which a rotary rod, mounted in the cylindrical body is rod connected to the second actuating member and comprises, at its end opposite said support member, a main pinion which meshes with two secondary pinions, arranged symmetrically with respect to the axis of said rod and comprising at their ends, screw-threaded rods of opposed pitch, which are engaged in respective tapped holes in an end-piece connected to the body, said secondary pinions comprising at their other end, two parallel push-rods which are in contact with two opposed sides of a swing-bar which is keyed on a vertical shaft supporting the rear view mirror.

11. A device for adjusting a rear-view mirror according to claim 10, in which the support member comprises a split collar in which an end-piece supporting the rear-view mirror is mounted for rotation, and the collar is clamped by a screw subject to the action of spring means.

12. A device for adjusting a rear-view mirror according to claim 1, in which an end-piece on the support member comprises a bearing in which the vertical shaft is mounted for rotation, a sleeve is fixed to said shaft, and said sleeve comprising housings in which finger members provided on a ring integral with the casing are retained by action of a spring member.

* * * * *